INVENTORS W. V. K. LARGE
R. O. SOFFEL
B. J. YOKELSON

INVENTORS
W. V. K. LARGE
R. O. SOFFEL
B. J. YOKELSON

BY
ATTORNEY

United States Patent Office 2,826,638
Patented Mar. 11, 1958

2,826,638

SIGNALING SYSTEM

Wayne V. K. Large, Locust Valley, Robert O. Soffel, Hastings-on-Hudson, and Bernard J. Yokelson, Brooklyn, N. Y., assignors to Bell Telephone Laboratories, Incorporated, New York, N. Y., a corporation of New York Application April 26, 1952, Serial No. 284,622

15 Claims. (Cl. 179—16)

This invention relates to signaling systems and more particularly to a receiver of signals each consisting of a plurality of frequencies.

The object of this invention is to improve the accuracy of performance of a receiver of multifrequency pulses.

A feature of this invention is a means for obviating any malfunctioning of a multifrequency receiver which may result from the generation of modulation products by a limiting amplifier.

Another feature of this invention is a means for developing for one or more electron-discharge devices a bias potential which is a function of the amplitude of an incoming alternating-current signal.

Another feature of this invention is an improved means for detecting the presence of an incoming signal and for accurately discriminating between the voltage of an incoming signal and other voltage conditions.

In general, the subject of this invention is a multifrequency receiver of the general type disclosed in Patent 2,332,912, granted October 26, 1943, to G. Hecht, A. A. Lundstrom and E. R. Taylor, and may be used in conjunction with the same apparatus with which the receiver shown in that patent is exemplarily associated. The receiver of the present invention may also, for example, be utilized in conjunction with the key pulsing incoming sender disclosed in Patent 2,236,246, granted March 25, 1941, to G. V. King et al., with the incoming multifrequency register circuit shown in Patent 2,596,584 granted May 13, 1952, to H. J. Michael and W. Whitney, with the automatic monitor, register and sender test circuit disclosed in Patent 2,508,052, granted May 16, 1950, to O. H. Williford, and with the cross-bar tandem multifrequency sender circuit disclosed in Patent 2,559,312, granted July 3, 1951, to J. B. Newsom.

Figure 1:
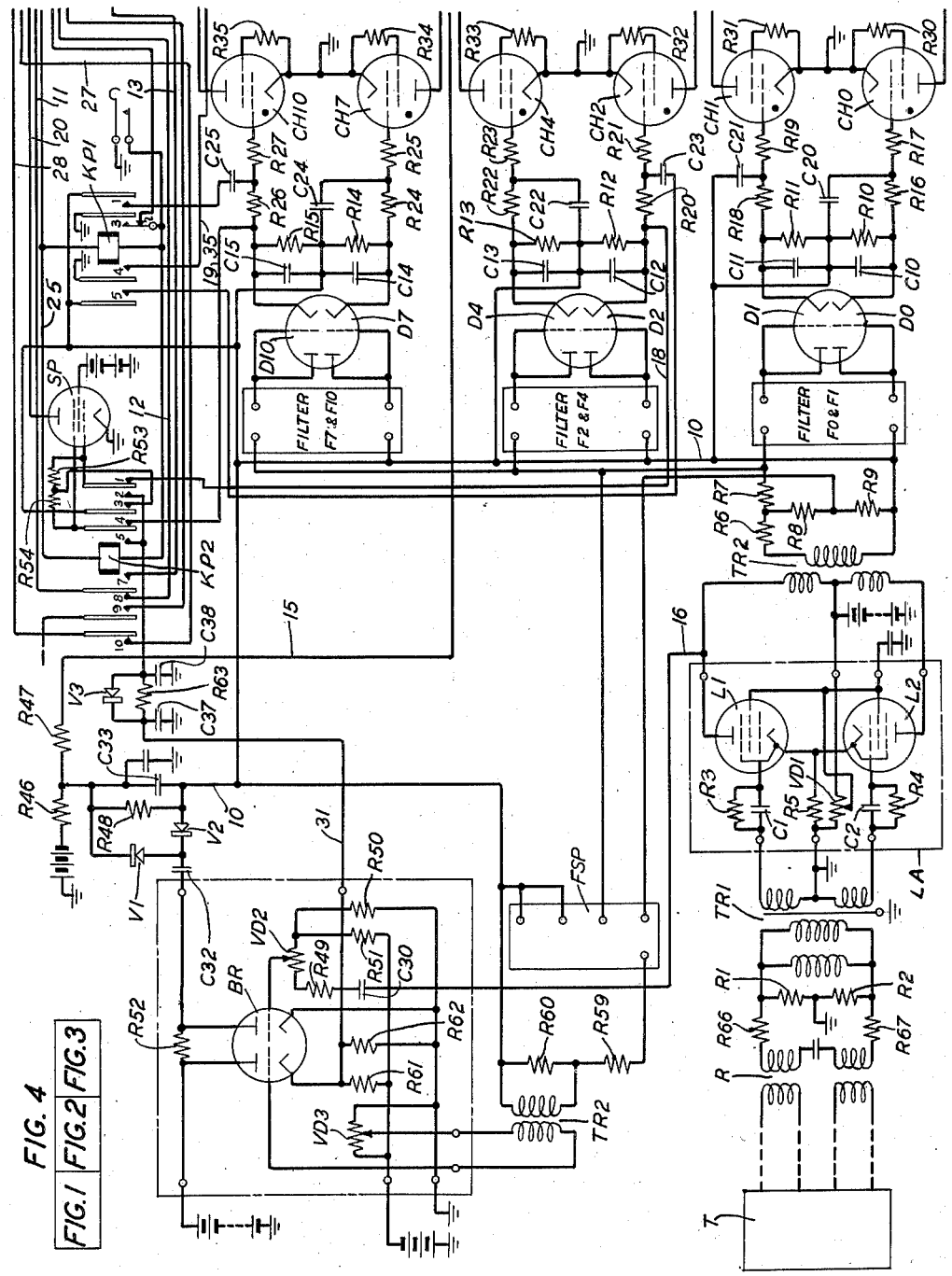
Figure 2:
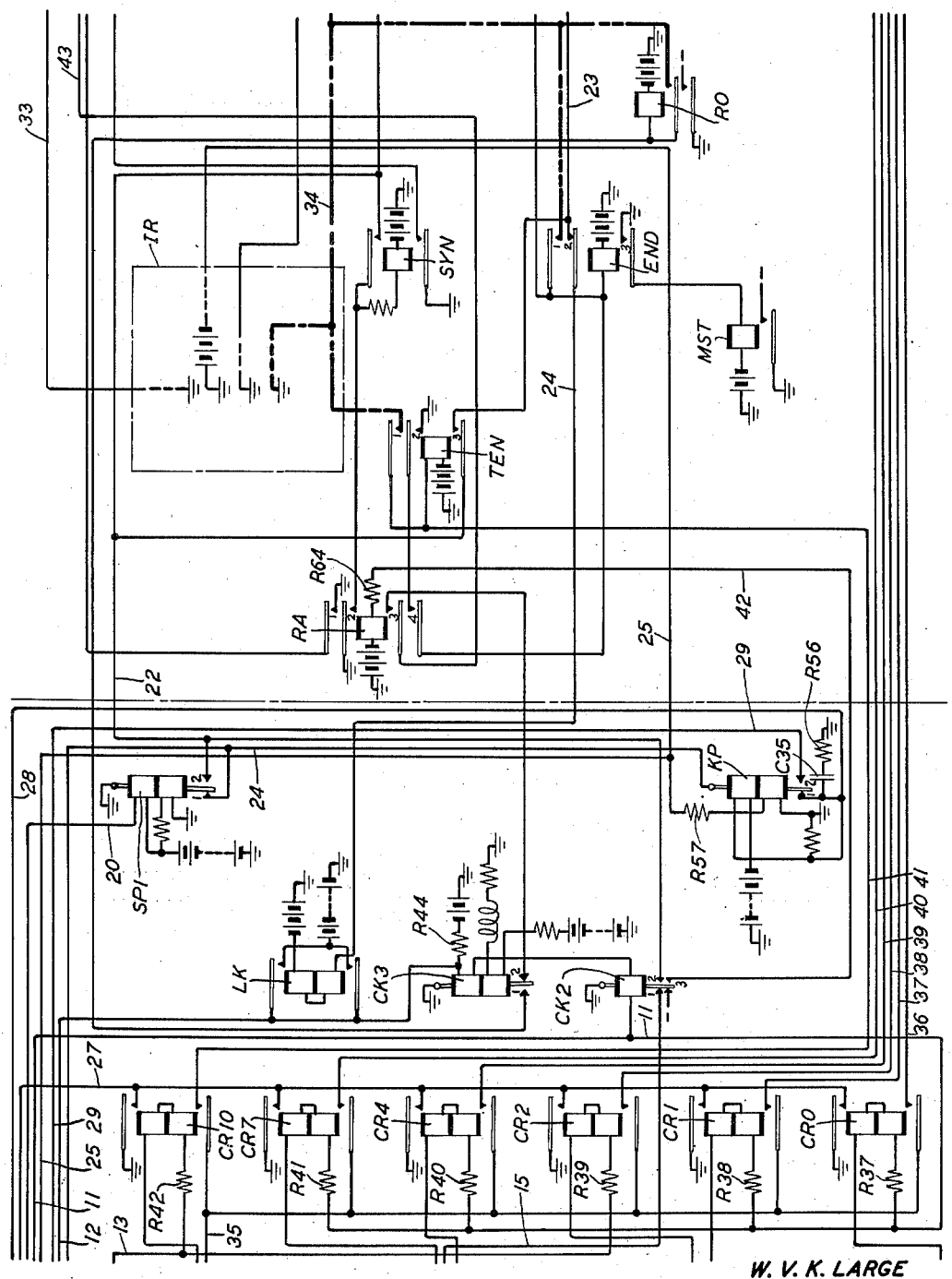
Figure 3:
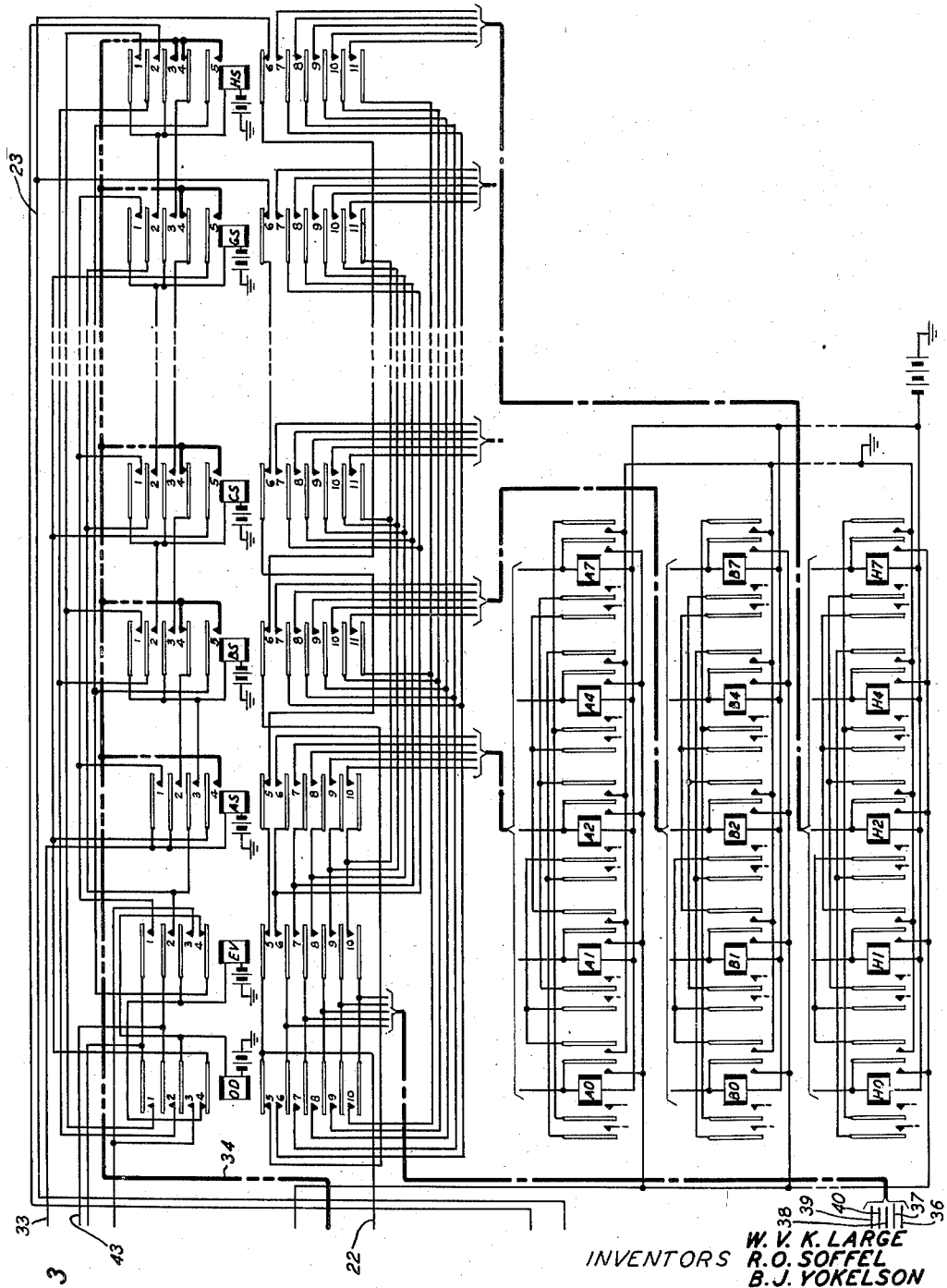

The preferred embodiment of the invention is shown in the accompanying drawing, the multifrequency receiver being shown in Fig. 1 and in the left-hand portion of Fig. 2; an exemplary register being shown in Fig. 3 and in the right-hand portion of Fig. 2; and the manner in which Figs. 1 to 3 are to be arranged being shown in Fig. 4.

The receiver shown in Figs. 1 and 2 of the drawing includes a limiting amplifier LA which either amplifies or attenuates an incoming signal depending upon the amplitude thereof; a "key pulse" signal circuit including channel filters F2 and F10, rectifiers D2 and D10, tube SP, and relays SP1, KP, KP1 and KP2; a "signal present" circuit including filter FSP, the left-hand section of dual triode BR, tube SP and relay SP1; a plurality of receiving channels, one for each of the signaling frequencies, each of the channels including a band-pass filter F0 to F10, a rectifier D0 to D10, a channel tube CH0 to CH10 and a channel relay CR0 to CR10; a fixed bias circuit for the channel tubes including resistors R46 and R47; a variable bias circuit for the channel tubes including the right-hand section of dual triode BR and a voltage-doubling rectifier; and means comprising relays CK2 and CK3 for insuring that the system will not operate unless signals of predetermined number and frequency are concurrently received.

Although the disclosed receiver may be readily adapted to be responsive to any number of concurrently received signals in any suitable frequency code combination, in the illustrated embodiment, each digit of a telephonic designation is represented by a different combination of two out of an available five frequencies. An additional frequency permits the establishment of other codes for control purposes.

While these frequencies may occupy any available band, it has been found convenient to employ signals in the audio frequency range in order that presently available telephonic transmission facilities may be utilized without substantial modification thereto. Thus, signal frequencies of 700, 900, 1100, 1300 and 1500 cycles per second have been proved to be suitable for representing, in combinations of two, the digits of telephonic designations. For mnemonic purposes, these frequencies may be arbitrarily code designated as the Nos. 0, 1, 2, 4 and 7 frequencies, respectively, so that, with the exception of the representation of the digit "0," the digit which is represented by any pair of frequencies is equal to the sum of the code designations of those two frequencies. Thus, for example, a signal comprising two frequencies of 700 and 900 cycles per second (the Nos. 0 and 1 frequencies) represents the digit "1" and a signal comprising two frequencies of 900 and 1100 cycles per second (the Nos. 1 and 2 frequencies) represents the digit 3.

The frequencies assigned to represent each of the other digits may be tabulated as follows:

Table I

| Digit | Designations | Frequencies |
|---|---|---|
| 0 | (4), (7) | 1,300, 1,500 |
| 1 | (0)+(1) | 700, 900 |
| 2 | (0)+(2) | 700, 1,100 |
| 3 | (1)+(2) | 900, 1,100 |
| 4 | (0)+(4) | 700, 1,300 |
| 5 | (1)+(4) | 900, 1,300 |
| 6 | (2)+(4) | 1,100, 1,300 |
| 7 | (0)+(7) | 700, 1,500 |
| 8 | (1)+(7) | 900, 1,500 |
| 9 | (2)+(7) | 1,100, 1,500 |

Certain control signals additional to the digit representations may be represented by the combination of certain of the above frequencies with an additional frequency, such as 1700 cycles per second, arbitrarily designated frequency No. 10. Thus, a "start" signal may be represented by the Nos. 7 and 10 frequencies, 1500 and 1700 cycles per second, and a "KP" signal, indicative of the commencement of pulsing, may be represented by the Nos. 2 and 10 frequencies, 1100 and 1700 cycles per second.

According to the exemplary mode of operation, the following are received in sequence: a "KP" signal, a plurality of pulses, each comprising two frequencies, representing the several digits of the called designation, and a "start" pulse.

The "KP" signal is transmitted as an indication that key pulsing is to begin, to prepare the receiver for operation. When the receiving circuit is cut through to the transmitting station at the beginning of a call, there is a brief period during which it may be exposed to speech or noise currents which, if the receiving circuit were ready to receive signal frequency impulses, might cause it to operate falsely and thereby produce a false setting of the first settable register. To prevent this, the receiving circuit is normally held in a condition in which signal impulses cannot be registered until after the "KP" signal, a definite timed impulse comprising the Nos. 2 and 10 frequencies, is received.

The start signal, consisting of a voltage pulse of frequencies No. 7 and No. 10, is sent out by the transmitting station after all the digit codes have been transmitted, but whether or not it serves any useful purpose depends upon the register arrangement provided in the sender or other circuit with which the receiving circuit is associated. In some installations all calls involve the same number of digits and the sender or other circuit proceeds as soon as the full complement of digits has been received. In others, the number of digits varies from call to call, and it is necessary to indicate when all the digits that are necessary have been registered. The start signal serves this purpose, and although it is superfluous in the former case, it is always transmitted in order to avoid operating complications.

Referring now to Fig. 1 of the drawing, rectangle T represents the apparatus, i. e., transmitting station, from which the signals emanate. In practice, this source may be a multifrequency key set, or a sender connected to the subject receiver by a trunk. The receiving circuit may also be used in conjunction with a key monitoring circuit at the sending end to check the outgoing pulses, and it may be used as part of a test circuit to check the pulses sent out by senders or operators. In either case, the incoming signal is applied through repeating coil R to the step-up input transformer TR1. Resistors R66 and R67 and grounded resistors R1 and R2 serve as an impedance correcting network.

The signal appearing at the secondary winding of transformer TR1 is applied to the control grids of pentodes L1 and L2 of the limiting amplifier LA. Tubes L1 and L2 are connected in the well-known push-pull relation, with the respective anodes being connected to a source of positive potential, each through one section of the primary winding of output transformer TR2. The action of the limting amplifier LA is such that a weak incoming signal is amplified to a value satisfactory for channel operation, while a strong signal is limited to a preselected maximum value at the output transformer TR2.

The limiting action of the limiting amplifier LA results from the characteristics of the networks interposed in the control-grid circuits of tubes L1 and L2. These networks, comprising resistor R3 and capacitor C1 and resistor R4 and capacitor C2, respectively, cause the control grids to become more negatively biased when the alternating signal voltage applied to the control grids is of sufficient amplitude to cause grid current to flow during the positive half waves. When this condition occurs, the voltage output of the limiter becomes substantially constant regardless of further increases in the amplitude of the incoming signal. The actual point at which limiting occurs is controlled, in part, by both the control grid bias and the voltage bias on the screen grids of tubes L1 and L2. The screen grid bias may be varied by adjusting voltage divider VD1 which is connected between ground and a source of positive potential. Resistor R5 is used to render tubes L1 and L2 self-biasing.

Amplifier LA limits the voltage of information representing signals to a value sufficiently low to avoid interference in unselected channels. However, certain of the modulation products generated as a result of the limiting action of amplifier LA fall within the voice frequency ranges employed in signaling, and, as a consequence, might result in the activation of a non-selected channel. Additionally, over a part of the operable range these modulation products increase with signal amplitude, since the degree of limiting grows with such increase. The possibility of improper activation of a non-selected channel as a result of the generation of modulation products is, however, obviated by the variable bias circuit, hereinafter to be described.

The signal appearing at the secondary winding of output transformer TR2 is applied both to the channel filters F0, F1, F2, F4, F7 and F10 and to the band-pass filter FSP. Resistors R6, R7, R8 and R9 form a pad, with the voltage developed across resistor R9 being applied to the input terminals of band-pass filter FSP and with the voltage developed across resistors R8 and R9 being applied to the input terminals of the channel filters F0, F1, F2, F4, F7 and F10.

The channel filters may be any conventional type of narrow band-pass filter. If voltage of the frequency for which any one of the channel filters is tuned is present in the incoming signal, that voltage will be applied through that channel filter to the tssociated diode-connected triode D0, D1, D2, D4, D7 or D10. The signal voltage is rectified by the rectifier D0 to D10, producing a positive direct voltage across the associated load resistor R10 to R15, with the voltage peaks being by-passed by the associated shunting capacitor C10 to C15. This voltage, modified by a bias voltage applied through resistors R10 to R15 over conductor 10 from a source hereinafter to be described, is applied through the associated ripple-filter resistors R16—R17, R18—R19, R20—R21, R22—R23, R24—R25, or R26—R27 to the control grid of the associated channel tube CH0, CH1, CH2, CH4, CH7 or CH10.

Grid by-pass capacitors C20, C21, C22 and C24 are directly connected to the alternating-current ground conductor 10, but the paths over which grid by-pass capacitors C23 and C25, individual to channel tubes CH2 and CH10, respectively, are connected to conductor 10 include front contacts No. 5 and No. 1, respectively, of relay KP1. Capacitors C23 and C25 are thus disabled prior to the operation of relay KP1 in order to reduce the time constant of the circuit in preparation for fast conduction and rapid cut-off of tube SP at the beginning and termination, respectively, of the "KP" signal, as will be hereinafter discussed.

While the channel tubes CH0 to CH10 may be of any suitable type, hot cathode gas tetrodes have been found to be well adapted to perform the requisite functions, and such are shown on the drawings. The cathodes of the channel tubes CH0 to CH10 are grounded and the screen grids are connected to the cathodes through individual resistors R30 to R35. A channel relay CR0 to CR10 is provided for each of the channel tubes CH0 to CH10. The output circuits of the channel tubes CH0, CH1, CH4 and CH7 may be traced from the anodes of these tubes, through the windings of the associated channel relays CR0, CR1, CR4 and CR7, respectively, and through individual load resistors R37, R38, R40 and R41, respectively, to conductor 11. The plate circuits for these channel tubes may then be traced over either of two alternative paths. One of these paths is from conductor 11, through the winding of polarized checking relay CK2, upper winding of polarized checking relay CK3, front contacts of normally unoperated relay LK to a source of positive potential, ground and to the cathodes of tubes CH0, CH1, CH4 and CH7, respectively. The other of these paths is from conductor 11, No. 8 contacts of relay KP2, conductor 12, to grounded positive battery through the contacts of relay LK, when the relay is operated, and to the cathodes of tubes CH0, CH1, CH4 and CH7, respectively. It may be noted that a source of negative potential is connected through resistor R44 to conductor 11 to apply a negative potential to the anodes of channel tubes CH0, CH1, CH4 and CH7 at any time during which relay LK is not operated. This serves affirmatively to disable these channel tubes and thereby obviate any possibility of operation at an improper time.

The output circuits of the channel tubes CH2 and CH10 are rendered ineffectual to operate relay KP2 until after the "KP" signal is received. These output circuits may be traced from the anodes of tubes CH2 and CH10, through the windings of relays CR2 and CH10 and resistors R39 and R42, respectively, conductor 13, No. 7 contacts of relay KP2, when those contacts close as a result of the operation of relay KP2, conductor 11, winding of polarized relay CK2, upper winding of polarized relay CK3, front contacts of normally unoperated relay LK to a source of positive potential, ground, and to the cathodes of tubes CH2 and CH10, respectively.

Therefore, upon the establishment of conduction in any one of the channel tubes CH0 to CH10, the appropriate channel relay CH0 to CH10 will be operated.

The potential applied to the control grid of any one of the channel tubes CH0 to CH10 comprises three components. One of these is a positive direct-current component derived by the rectification of an alternating-current signal voltage received through the associated channel filter, as previously described. This alternating-current signal may be either a signal transmitted to convey intelligence or a modulation product generated in the limiting amplifier LA.

The other two components of the potential applied to the control grid of any one of the channel tubes CH0 to CH10 are a fixed negative biasing potential and another biasing potential the amplitude of which is a function of the amplitude of the incoming signal. The fixed biasing potential is normally derived from the potential divider comprising negative battery, resistors R46 and R47, conductor 15, and ground through the No. 1 back contact of normally unoperated check relay CK2. The negative potential appearing at the junction of resistors R46 and R47 is applied through varistors V1 and V2, which are unidirectional current conducting devices, and through resistor R48 in parallel therewith, and then via conductor 10 to the junction of the rectifier load resistors R10—R11, R12—R13, and R14—R15. The fixed bias potential then appears at the control grids of the channel tubes CH0 to CH10 through these load resistors and through the series filtering resistors R16—R17, R18—19, R20—R21, R22—R23, R24—R25, and R26—R27. The fixed negative bias thereby impressed upon the channel tube control grids is sufficient to maintain the channel tubes in a non-conductive condition in the absence of the application thereto of a positive direct voltage derived from rectification of an incoming alternating-current signal.

The amplitude of the variable bias, as before noted, is a function of the amplitude of the incoming signal but is substantially constant at signal levels above that at which limiting begins. The variable bias circuit, therefore, serves to make the sensitivity of the channel tubes CH0 to CH10 vary inversely with the amplitude of the signal at the output of the limiting amplifier. The signal appearing at the anode of tube L1 of the limiting amplifier LA is applied via conductor 16, capacitor C30, resistor R49, variable voltage divider VD2, and thence to ground via resistor R50 and to negative battery via resistor R51. Consequently, both an alternating signal voltage and a direct biasing voltage are applied from the tap on variable voltage divider VD2 to the control grid of the right-hand section of dual triode BR. The signal appearing at the grid of the right-hand section of tube BR is amplified and the resulting varying potential at the anode of this section of tube BR, developed across load resistor R52, is applied to a conventionally designed rectifier voltage-doubling circuit comprising varistors V1 and V2, resistor R48 and capacitors C32 and C33. The polarity of varistors V1 and V2 is such that a negative direct potential is derived from the aforementioned doubler circuit, the potential being thereafter conducted to the control grids of the channel tubes CH0 to CH10 via the same previously traced paths over which the fixed negative bias is applied. As the limiting amplifier input signal is increased in amplitude, the amount of limiting increases, the modulation products consequently increase in amplitude, and the amount of negative bias on the channel tubes CH0 to CH10 is correspondingly increased to maintain a margin of safety against operation of unwanted channel tubes in response to the generated modulation products. It will be noted that the fixed bias circuit establishes a predetermined minimum biasing potential and that the variable bias circuit is effective, if the limiting amplifier is actuated, to increase the bias on the channel tubes, i. e., to tend to establish a control-grid potential which is more negative than the negative potential established by the fixed biasing circuit alone.

As previously noted, the establishing of conduction in the channel tubes is contingent upon, at least, the operation of relay LK, since that relay controls the extension of a path from a source of operating voltage to the tube anodes. The operation of relay LK is, in turn, controlled by apparatus responsive to the receipt of the "KP" signal, i. e., of a relatively long pulse of frequencies No. 2 and No. 10. The circuit arrangements are such that the channels are disabled until a signal of the two "KP" frequencies, and those two frequencies only, is received for the prescribed minimum time.

When the two incoming voltages of frequencies denoting the "KP" signal are received, they traverse the input circuit and are amplified or attenuated, as required, by the limiting amplifier LA. A portion of the signal energy is then diverted to the variable bias circuit as above described, responsive to which an additional biasing potential is or may be applied to all of the channel tubes CH0 to CH10. Voltages of signaling frequencies No. 2 and No. 10 are also applied through transformer TR2 and the filter input pad comprising resistors R6 to R9 to all of the channel filters F0 to F10. Since voltages of frequencies No. 2 and No. 10 are assumed to be present, those voltages will be passed by channel filters No. 2 and No. 10, respectively, rectified by rectifiers D2 and D10, respectively, and then applied through the series resistors R20—R21 and R26—R27, respectively, to the control grids of the channel tubes CH2 and CH10, respectively. No conduction can occur in these tubes, however, since their plate circuits are open both at the No. 7 contacts of unoperated relay KP2 and at the contacts of unoperated relay LK. The voltages at the cathodes of rectifiers D2 and D10, each of which includes the negative fixed and variable bias components and the positive rectified-signal component, are, however, also applied via conductor 18 and the No. 1 contacts of relay KP2 to the control grid, and via conductor 19 and the No. 4 contacts of relay KP2 to the suppressor grid, respectively, of tube SP. The characteristics of vacuum tube SP are such that no conduction can take place therein unless both the control and suppressor grids are approaching positive potential. Normally, a negative bias is impressed on both the control and suppressor grids over a path extending therefrom through resistors R53 and R54, respectively, No. 3 contacts of unoperated relay KP2 and conductor 10 to both the aforementioned fixed and variable biasing potential sources. Upon the coincident application of the potentials derived from the "KP" signal to the control and suppressor grids, however, plate current flows from positive battery, through the upper winding of polarized relay SP1, conductor 20, anode and cathode of tube SP, to ground, whereby relay SP1 is operated. Relay SP1, in operating, connects ground through its No. 2 contacts to conductor 22 which extends to the circuits with which the subject receiver is associated. If those associated circuits be normal, the ground on conductor 22 is returned to the receiver on conductor 24 to operate relay LK. As previously mentioned, in the disclosed exemplary embodiment of the invention, the receiver is associated with an incoming register circuit which is shown at the right-hand side of Fig. 2 and on Fig. 3 of the drawing. Conductor 22 extends to Fig. 3, and the ground thereon is applied over one path, through the No. 5 contacts of relay OD, No. 6 contacts of relays BS, DS (not shown), FS (not shown) and HS, and then to conductor 23, and, over another path through the No. 5 contacts of relays EV and AS, and through the No. 6 contacts of relays CS, ES (not shown) GS and to conductor 23. Therefore, if the register is normal, conductor 23 will be grounded, and this ground will be applied through the No. 2 contacts of relay END, conductor 24, and the windings of relay LK to negative battery, whereby relay LK will be operated. Relay LK, in operating, applies plate potential to the anode of tubes CH0, CH1, CH4 and CH7 over the previously traced paths, but the plate circuits of tube CH2 and CH10 are still open at the No. 7 contacts of relay KP2, as above noted. If a third frequency pulse accompanies the KP signal, a positive potential will be applied to the control grid of one of the channel tubes CH0, CH1, CH4 or CH7 and this tube will, therefore, become conductive, thereby operating its associated channel relay CR0, CR1, CR4 or CR7.

Prior to the operation of relay SP1, the armature of relay KP is held on its No. 1 contact by reverse current flowing through its secondary winding, the circuit for which may be traced from ground at the No. 1 contact of relay SP1, through conductor 24, the armature and No. 1 contact of relay KP, the upper (secondary) winding of relay KP and negative battery. It will be noted that capacitor C35, one terminal of which is connected to ground through resistor R56, is discharged under this condition. Upon the operation of relay SP1, the ground is removed from conductor 24, disabling the above-described holding circuit. However, the removal of this ground permits capacitor C35 to commence charging over a path from ground, via resistor R56, capacitor C35, and the upper winding of relay KP to negative battery. The current through the upper or secondary winding of relay KP will, therefore, decay exponentially. While this current remains above a predetermined value, relay KP is held in its unoperated position, as shown, despite the existence of an operating flux generated its lower or primary winding. This flux is induced by the flow of current from ground, through the lower winding of relay KP, resistor R57, conductor 25, relay contacts (not shown) in the portion of the incoming register depicted as rectangle IR, to negative battery. When the current through the secondary winding of relay KP decays sufficiently, relay KP will operate to close its No. 2 contacts.

It may be noted at this point that voltages of both frequencies No. 2 and No. 10 must be present in order for relay KP, to be actuated, as previously described, and that if voltages of an additional frequency or frequencies are received, relay KP will not be operated even though voltages of frequencies No. 2 and No. 10 be present. Thus, if any other of the signal frequency voltages is concurrently received, the appropriate one of the channel tubes CH0, CH1, CH4 or CH7 and the appropriate one of the channel relays CR0, CH1, CR4 or CR7 will be operated, since anode voltage was supplied through the windings of these relays to the anodes of those tubes upon the operation of relay LK, as above described. If any one of these channel relays CR0, CR1, CR4 or CR7 operates, ground will be applied through its upper front contacts, conductor 27, No. 10 contacts of unoperated relay KP2, conductor 28 to timing capacitor C35 and the upper winding of relay KP, thereby to retain capacitor C35 in its discharged condition and to prevent relay KP from operating. If this condition exists, the apparatus will be restored to normal upon the termination of the signal.

If the signal includes only voltages of the "KP" signal frequencies, relay KP will operate, as above noted. Upon the termination of that signal, tube SP again becomes non-conductive, whereupon relay SP1 releases. Upon the release of relay SP1, the previously traced loop through the register is opened and relay LK releases, whereby plate voltage is removed from the channel tubes. Additionally, upon the release of relay SP1, relays KP1 and KP2 are operated over a circuit from ground at the No. 1 contacts of relay SP1, conductor 24, armature and No. 2 contacts of relay KP, conductor 29, No. 2 contacts of relay KP1, windings of relays KP1 and KP2 in parallel, to the negative battery potential on conductor 25. Relays KP1 and KP2, in operating, place the apparatus in condition for the reception of digit pulses. For example, conductor 13, extending from resistors R39 and R42 at the windings of channel relays CR2 and CR10, respectively, is conneceted through the No. 7 contacts of relay KP2 to conductor 11 which extends to the winding of relay CK2 and also to resistors R37, R38, R40 and R41 which are individual to relays CR0, CR1, CR4 and CR7, respectively. Thus, after the operation of relay KP2, the anode circuits for channel tubes CH2 and C10 are no longer dissimilar from the anode circuits for the other channel tubes.

Additionally, as previously noted, while capacitors C20, C21, C22 and C24 are permanently connected as bypass capacitors around resistor pairs R10—R16, R11—R18, R13—R22, and R14—R24, respectively, capacitor C23, associated with channel tube CH2, and capacitor C25, associated with channel tube CH10, were originally disconnected. However, upon the closure of the No. 5 and No. 1 contacts of relay KP1, capacitor C23 is connected in by-pass of resistors R12 and R20, and capacitor C25 is connected in by-pass of resistors R15 and R26.

When the two-frequency signal representing the first digit of the called designation is received, it appears as a positive potential at the control grids of the two appropriate channel tubes, the actual voltage at the control grid of these channel tubes being the resultant of a positive voltage derived from the rectification of the signal voltage, a negative fixed bias, and a negative bias the amplitude of which is a function of the amplitude of the incoming signal. The channel tubes cannot become conductive at this instant, however, since relay LK is released and plate voltage is not supplied to the channel tubes. The operation of relay LK is controlled by the "signal present" circuit which functions to recognize the presence of an incoming signal. One function of this "signal present" circuit is to delay recognition of the incoming signal frequencies in the channels until the so-called "shock" transient set up in the filters is dissipated. Another function of the "signal present" circuit is to prevent duplicate registration on a prolonged incoming digit signal.

Band-pass filter FSP has a relatively flat low-loss characteristic over the range of the signal frequencies and serves to permit operation of the apparatus over noisy circuits. The voltage input to filter FSP is taken across resistor R9 of the "T" pad comprising resistors R6 to R9, and the output of filter FSP is terminated in resistors R59 and R60 which serve as a voltage divider to provide the desired voltage at the primary winding of transformer TR2. The voltage output from the secondary winding of transformer TR2 is applied to the control grid of the left-hand section of dual triode BR. The cathode of this section is connected to negative battery through resistor R61 and to ground through resistor R62; and adjustable voltage divider VD3, connected between ground and negative battery, applies a negative direct voltage to the control grid through the secondary winding of transformer TR2, the several parameters being selected to establish a negative bias of the proper value to cause the left-hand section of tube BR to function as a rectifier. The output of this section, taken from its cathode, is applied via conductor 31, resistor R63, Nos. 2 and 5 contacts of operated relay KP2 to the control grid and suppressor grid of vacuum tube SP. Capacitors C37 and C38 serve as filter capacities, the capacity of capacitor C38 being selected to provide the desired delay between signal receipt and signal recognition. Varistor V3 is connected to reduce the time constant of the resistor R63-capacitor C38 combination at the termination of the signal to reduce the release time of relay SP1, which is controlled by tube SP. It may be noted that the control and suppressor grids of tube SP have been disconnected from the high negative biasing potential on conductor 10 by the opening of the No. 3 contact of relay KP2.

When tube SP is rendered conductive, relay SP1 is operated over the previously traced path, which causes relay LK to operate over a loop through the associated idle register or sender, as previously described. Relay LK, in operating, completes the plate circuits of the channel tubes and, as a result, those of the channel tubes CH0 to CH10 which have the proper potential at their control grids are rendered conductive, thereby operating their associated channel relays CR0 to CR10. Since the windings of marginal relays CK2 and CK3 are included in the plate circuits of each of the channel tubes CH0 to CH10, either or both of these relays will operate if the current through their windings is sufficient. Relay CK2 may be adjusted to operate if any one of the channel tubes CH0 to CH10 becomes conductive, but it will herein be assumed that it is so adjusted that it will operate only if the plate current of at least two of the channel tubes CH0 to CH10 concurrently flows in its windings. Relay CK3 is adjusted to operate only if at least three of the channel tubes CH0 to CH10 are concurrently conductive. At the present, it will be assumed that but two of the channel tubes CH0 to CH10 are conducting, whereby relay CK2 is operated but relay CK3 remains released.

As before noted, the subject multifrequency receiver has been exemplarily associated with an incoming register circuit which is represented in part by rectangle IR on Fig. 2 of the drawing, the remainder of the circuits being represented in detail on Figs. 2 and 3 of the drawing. The incoming register, in response to its seizure by a trunk circuit, grounds conductor 33 to operate the "A" digit register steering relay AS (Fig. 3). Relay AS locks operated through its No. 2 contacts, No. 4 contacts of relay BS, off-normal ground conductor 34 (which is represented by a heavy intermittently double dashed line) and to ground through certain relay contacts (not shown) in the incoming register. "Even" relay EV operates over a path including the No. 4 contacts of unoperated relay OD, the No. 4 contacts of operated relay AS and ground on conductor 34.

When two of the channel relays CR0 to CR7 operate, the ground at the No. 4 contacts of operated relay KP1 is extended over conductor 35, through the lower front contacts of the operated two of the channel relays CR0 to CR7, to the appropriate pair of the conductors 36 to 40, through two of the No. 6 to No. 10 contacts of operated relays EV and AS, and through the windings of the appropriate pair of A digit register relays A0 to A7 to negative battery, whereby two of the A digit register relays A0 to A7 are operated to register the first of the received digits.

Upon the operation of relay CK2, as above described, "register advance" relay RA operates over a path from ground at the No. 3 contacts of relay CK2, via conductor 42, resistor R64, and the winding of relay RA, to negative battery. Relay RA, in operating, provides an auxiliary locking circuit for steering relay AS through the No. 1 contacts of relays RA, EV and AS. Relay RA also completes a path from ground at the No. 2 contacts of unoperated relay CK3, No. 3 contacts of relay RA, conductor 43, No. 2 contacts of relay EV, No. 3 contacts of relay AS, through the winding of relay BS to negative battery, to operate relay BS. Relay RA, in operating, also connects ground through its No. 2 contacts to operate synchronizing relay SYN.

It will be recalled that conductor 22 was connected to conductor 23 over two alternative paths through back contacts of the steering relays OD, EV and AS to HS. One of these paths was disrupted at the operation of relays EV and AS, and now, with the operation of relay BS, the other of these paths is interrupted. Consequently, relay LK releases, causing extinction of conduction in the previously conductive channel tubes, releasing the operated ones of the channel relays and releasing operated relay CK2. Relay CK2, in releasing, releases relay RA which, in turn both releases relay AS and interrupts the initial operating circuit for relay SYN, which, however, is locked operated over a path including its own upper contacts, conductor 22, and the No. 2 contacts of the operated "signal present" relay SP1. Upon the termination of the incoming signal, relay SP1 releases, as previously described, and at that time relay SYN releases.

When both relay SYN and relay AS have been released, relay EV releases, since its operating circuit becomes interrupted at the No. 4 contacts of relay AS and its locking circuit is interrupted at the lower contacts of relay SYN. At the release of relay EV, relay OD operates over a circuit extending from negative battery, through the winding of relay OD, No. 4 contacts of relay EV, and No. 5 contacts of operated relay BS to ground on conductor 34. Additionally, upon the release of relay EV, conductor 22 is again connected to conductor 23 in preparation for the receipt of the next succeeding digit.

The second or "B" digit is registered in a similar fashion, with "signal present" recognition taking place as on the first digit, and with two of the channel relays becoming operated. Two of the "B" digit register relays B0 to B7 and steering relay CS operate, the operated pair of channel relays CR0 to CR7 release and relay BS releases. At the termination of the pulse, relays SYN and OD release and relay EV operates, as before.

In a similar manner the subsequent digits are registered so that the called designation is recorded on all or part of the "A" to "H" digit registers. Upon the registration of the final digit, relay END operates instead of a succeeding steering relay. Relay END, in operating, disconnects conductor 23 from conductor 24 to release relay LK and operates "marker start" relay MST which performs certain control functions unimportant to the present considerations.

Relay TEN operates when relay KP1 and channel relay CR10 are operated. Thus, if the start signal, comprising frequencies No. 7 and No. 10, is received subsequent to setting of the receiver by the KP signal, relay TEN is operated to perform certain control functions when the number of digits in the called designation is less than the maximum number of digits which the register is equipped to handle.

It was previously assumed that but two frequencies were received at any one time and that, therefore, relay CK3 did not operate. If three or more of the channel tubes CH0 to CH10 are, improperly, concurrently operated, marginal relay CK3 also operates. Relay CK3, in operating, interrupts the path over which ground potential was previously transmitted via the No. 3 contacts of relay RA and conductor 43 to contacts of the steering relays OD and EV, whereby steering to the next digit register is prevented. Relay CK3, in operating, also connects ground through its No. 1 contacts to the winding of relay RO which operates and transmits a signal indicating that the called designation should be retransmitted in full.

It is to be understood that the above-described arrangements are but illustrative of the application of the principles of the invention. Numerous other arrangements may be devised by those skilled in the art without departing from the spirit and scope of the invention.

What is claimed is:

1. In a signaling system, a receiver adapted to receive plural-frequency signals comprising means for amplifying and limiting incoming signals, a plurality of signal responsive devices, means interconnecting said amplifying and limiting means with said devices and responsive to the amplified and limited signals for selectively applying operating potentials to said signal responsive devices in accordance with the frequencies present in said signals, and non-tuned means connected to said amplifying and limiting means for developing and applying to said devices a variable opposing potential related in magnitude to the amplitude of said signals for desensitizing said signal responsive devices, thereby to prevent operation of non-selected ones of said devices by the modulation products generated by said amplifying and limiting means.

2. In a signaling system, a receiver adapted to receive sponsive devices, means interconnecting said amplifying and limiting incoming signals, a plurality of signal responsive devices, means interconnecting said amplifying and limiting means with said devices and responsive to the amplified and limited signals for selectively applying operating potentials to said signal responsive devices in accordance with the frequencies present in said signals, and non-tuned means connected to said amplifying and limiting means for developing and applying to said devices a variable opposing potential related in magnitude to the amplitude of said signals for desensitizing said signal responsive devices, thereby to prevent operation of non-selected ones of said devices by the modulation products generated by said amplifying and limiting means, said non-tuned means comprising an electron discharge device and a voltage-doubling rectifying means.

3. In a signaling system, a receiver adapted to receive plural-frequency signals comprising a limiting amplifier including an electron discharge device, a plurality of signal responsive devices, means connected to said amplifier and responsive to said signals for selectively applying operating potentials to said signal responsive devices in accordance with the frequencies present in said signals and non-tuned means connected to said limiting amplifier for developing and applying to said devices a variable opposing potential related in magnitude to the amplitude of said signals for desensitizing said signal responsive devices, thereby to prevent operation of non-selected ones of said devices by the modulation products generated by said amplifying and limiting means, said non-tuned means comprising a second electron discharge device having a control electrode, means connecting the control electrode of said second electron discharge device to said first electron discharge device, and a voltage-doubling rectifying means interconnecting said second electron discharge device with said signal responsive devices.

4. In a signaling system, a source of plural frequency signals, a first and a second filter means connected to said source for selectively passing a signal of one frequency and a signal of another frequency, a first rectifying means connected to said first filter means effective to derive a direct-current voltage from said signal of said one frequency, a second rectifying means connected to said second filter means effective to derive a direct-current voltage from said signal of said other frequency, and an electron discharge device having two control electrodes, one of said electrodes being connected to said first rectifying means and the other of said electrodes being connected to said second rectifying means, whereby the direct-current voltages applied to said electrodes from said rectifying means render said electron discharge device operative to produce an output signal.

5. In a signaling system, a source of plural frequency signals, a first and a second filter means connected to said source for selectively passing a signal of one frequency and a signal of another frequency, a first rectifying means connected to said first filter means effective to derive a direct-current voltage from said signal of said one frequency, a second rectifying means connected to said second filter means effective to derive a direct-current voltage from said signal of said other frequency, an electron discharge device having two control electrodes, one of said electrodes being connected to said first rectifying means and the other of said electrodes being connected to said second rectifying means, thereby to activate said electron discharge device when said two derived voltages are applied to said two control electrodes, and control means, including said electron discharge device, rendered effective in response to the receipt of a signal consisting of voltage components of said two frequencies for disconnecting said first and said second rectifying means from said electrodes.

6. Apparatus according to claim 5 in which said control means includes apparatus connected to said source for detecting the presence in said signal of voltage components of any other of said frequencies, said apparatus being rendered effective in response to the presence of said signal voltage components for disabling said disconnecting means, thereby to prevent disconnection of said rectifying means from said electrodes.

7. Apparatus according to claim 6 in which said apparatus for detecting the presence in said signal of voltage components of any other of said frequencies comprises a plurality of filter-rectifier pairs connected to said source and effective to derive a direct-current voltage from each of said components of said others of said frequencies, and means connected to said filter-rectifier pairs and rendered effective by the coincidence of a voltage at any one of said filter-rectifier pair output terminals and a signal produced by said electron discharge device for disabling said disconnecting means.

8. Apparatus according to claim 7 in which said means for disabling said disconnecting means comprises a pair of interconnected electromagnetically responsive devices connected to said electron discharge device, to said rectifiers, and to said disconnecting means.

9. Apparatus according to claim 8 in which said disconnecting means comprises an electromagnetically responsive device connected to said interconnected electromagnetically responsive devices and to said electrodes.

10. In a signaling system, a source of signals representing in combinations of different frequency voltage components items of information expressed in a code, means connected to said source for receiving said signals, a plurality of frequency discriminative filter-rectifier pairs connected to said receiving means for selectively channeling said different frequency voltage components to said rectifiers, thereby activating said rectifiers to derive an independent direct-current voltage from each of said different frequency voltage components, a register for registering items of information received in said code, normally disconnected connecting means for connecting said register to said rectifiers, means including two filter-rectifier pairs responsive to the receipt of a signal consisting of voltage components of two predetermined frequencies for actuating said normally disconnected connecting means to connect said register to said rectifiers, said signal responsive means comprising an electron discharge device having two electrodes, said device producing an output signal only upon the concurrent application of direct-current voltages to both of said electrodes, means for individually connecting said two filter-rectifier pairs to said electrodes thereby to apply said direct-current voltages to both of said electrodes and to activate said electron discharge device, control means connected to said electron discharge device and rendered responsive to the activation of said discharge device for sensing the voltage conditions at the output terminals of the remainder of said filter-rectifier pairs, said control means thereby remaining ineffective to actuate said normally disconnected connecting means when a signal is received at any one of said terminals and becoming effective to actuate said normally disconnected connecting means when no signal is received at all of said terminals, whereby in response to the receipt of a signal consisting of voltage components of said two predetermined frequencies said normally disconnected connecting means is rendered effective to extend connections to said register, thereby to enable said register to record subsequently received signals.

11. In a signaling system, a source of signals representing in combinations of different frequency voltage components items of information expressed in a code, means connected to said source for receiving said signals, a plurality of frequency discriminative filter-rectifier pairs connected to said receiving means for selectively channeling said different frequency voltage components to said rectifiers, thereby activating said rectifiers to derive an independent direct-current voltage from each of said different frequency voltage components, a register for registering items of information received in said code, normally disconnected connecting means for connecting said register to said rectifiers, means including two filter-rectifier pairs responsive to the receipt of a signal consisting of voltage components of two predetermined frequencies for actuating said normally disconnected connecting means to connect said register to said rectifiers, said signal responsive means comprising an electron discharge device having two electrodes, said device producing an output signal only upon the concurrent application of positive direct-current voltages to both of said electrodes, means connected to said receiving means and activated by signals received thereat for deriving a variable negative direct-current voltage of magnitude related functionally to the amplitude of said signals, means for normally impressing said variable negative voltage on said two electrodes, thereby to retain said electron discharge device in a deactivated condition, means for individually connecting said two filter-rectifier pairs to said electrodes, thereby to apply said positive direct-current voltages to both of said electrodes and to activate said electron discharge device in response to the receipt of a signal having voltage components of said two predetermined frequencies, control means connected to said electron discharge device and rendered responsive to the activation of said discharge device for sensing the voltage conditions at the output terminals of the remainder of said filter-rectifier pairs, said control means thereby remaining ineffective to actuate said normally disconnected connecting means when a signal is received at any one of said terminals and becoming effective to actuate said normally disconnected connecting means when no signal is received at all of said terminals, whereby in response to the receipt of a signal consisting of voltage components of said two predetermined frequencies, said normally disconnected connecting means is rendered effective to extend connections to said register, thereby to enable said register to record subsequently received information.

12. Apparatus according to claim 11 in which said means connected to said receiving means and activated by signals received thereat for deriving a variable negative direct-current voltage is additionally connected to each of said filter-rectifier pairs to variably desensitize said pairs according to a function of the amplitude of said received signals.

13. Apparatus according to claim 11 in which said means for normally impressing said variable negative voltage on said two electrodes comprises an electrical-path-extending-and-interrupting device which interconnects said negative voltage deriving means and said electrodes, said device being rendered responsive by the actuation of said normally disconnected connecting means to disconnect said variable negative voltage from said electrodes.

14. Apparatus according to claim 11 in which said negative voltage deriving means comprises an electron discharge device and a tandemly connected voltage doubling and rectifying device.

15. In a signaling system, a source of signals representing in combinations of different frequency voltage components items of information expressed in a code; means connected to said source for receiving said signals; groups of apparatus equal in number to the number of different frequency voltage components expressive of elements of information to be transmitted by said signals; each of said groups being connected to said receiving means and each comprising a filter tuned to and representative of one of said frequencies, a rectifier connected thereto for deriving a direct-current voltage from the signal voltage component passed by the filter connected thereto, a power amplifying device connected to the output terminal of said rectifier and arranged to produce an output signal in response to activation by said direct-current voltage, and an electromagnetically operated control device connected to said power amplifying device and rendered operative by said output signal; a register for registering items of information received in said code; a first electron discharge device connected to said receiving means and arranged to produce a first and a second direct-current voltage in response to activation by signals received thereat; said first voltage being negative in value; said second voltage being positive in value; both of said signals being functionally related in magnitude to the amplitude of the received signals; means for conveying said first voltage from said first electron discharge device to each of said rectifiers thereby to desensitize said rectifiers according to a function of the amplitude of said received signals; a second electron discharge device having two electrodes, said second electron discharge device producing a signal only upon the concurrent application of positive direct-current voltages to both of said electrodes; means including a first electromagnetically responsive control device for connecting said first electron discharge device to said two electrodes thereby to conduct said first and said second voltages thereto, said control device being additionally connected to a preselected pair of said rectifiers representative of two of said frequencies, said two frequencies being in turn representative of a "register prepare to receive information" signal; said first electromagnetically responsive control device, when deactivated, being effective to connect said first source of voltage to both of said electrodes and to connect said two rectifiers individually to said electrodes, and being further effective, when energized, to disconnect said first source of voltage and said rectifiers from said electrodes and to connect said second source of voltage thereto; means including a second control device connected to said second electron discharge device and responsive at times to an output signal received therefrom for applying voltage to certain of the electromagnetically responsive control devices and power amplifying devices included in said groups thereby to permit operation of said devices in the presence of a rectifier voltage at the output terminals of the associated rectifiers; a third electromagnetically responsive device connected to said second electromagnetically responsive device and rendered effective by said second device at said times for sensing the condition of each of said certain of said electromagnetically responsive control devices, said third device thereby remaining unoperated when any one of said certain of said devices is operated, and operating when all of certain of said devices are unoperated; means including said second electromagnetically responsive device for connecting said third electromagnetically responsive device to said first such device, thereby to actuate said first device in response to the actuation of said third device and the subsequent de-energization of said second device; and means including said third electromagnetically responsive means when operated for rendering said certain of said electromagnetically responsive control devices effective to actuate said registers over paths connected therebetween; whereby in response to the receipt of a "register prepare to receive information" signal consisting of voltage components of said two predetermined frequencies, said registers are effectively connected to said certain of said electromagnetically responsive devices, thereby to be prepared for subsequent information registration.

References Cited in the file of this patent

UNITED STATES PATENTS

| | | |
|---|---|---|
| 2,250,100 | Hubbard | July 22, 1941 |
| 2,282,271 | Terroni et al. | May 5, 1942 |
| 2,519,763 | Hoglund | Aug. 22, 1950 |
| 2,535,102 | Van Mierlo | Dec. 26, 1950 |
| 2,630,525 | Tomberlin | Mar. 3, 1953 |
| 2,654,002 | Hooijkamp et al. | Sept. 24, 1953 |
| 2,666,809 | Flowers | June 19, 1954 |